US012639197B1

(12) United States Patent
Verma et al.

(10) Patent No.: US 12,639,197 B1
(45) Date of Patent: May 26, 2026

(54) GENERATING PERFORMANCE TESTING SCENARIOS FROM PRODUCTION TRAFFIC DATA USING LARGE LANGUAGE MODELS

(71) Applicant: Intuit Inc., Mountain View, CA (US)

(72) Inventors: Yamoksh Verma, Bengaluru (IN); Chaitanya Muralidhar Bhatt, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/281,470

(22) Filed: Jul. 25, 2025

(51) Int. Cl.
*G06F 9/445* (2018.01)
*G06F 11/3668* (2025.01)

(52) U.S. Cl.
CPC ................................. *G06F 11/3684* (2013.01)

(58) Field of Classification Search
CPC ............. G06F 11/3684; G06F 11/3688; G06F 11/3692; G06F 11/3698; G06F 11/3676; G06F 11/3696; G06F 11/3672; G06F 11/368; G06F 11/3668; G06F 11/3636; G06F 11/3604; G06F 21/577; G06F 2221/033; G06F 18/214; G06F 2201/865; G06F 8/70; G06F 11/3457; G06F 8/77; G06F 11/2236; G06F 21/52; G06F 9/454; G06F 40/14; G06F 8/425; G06F 40/216; G06F 9/4498; G06F 9/44521; G06F 11/273; G06F 16/9027; G06F 30/3308;

G06F 8/436; G06F 8/44; G06N 20/00; G06N 3/08; G06N 3/045; G06N 7/01; H04L 43/50; H04L 67/34
See application file for complete search history.

(56) References Cited

U.S. PATENT DOCUMENTS

| | | | |
|---|---|---|---|
| 2014/0282434 A1* | 9/2014 | Eilam ................. | G06F 11/3612 717/124 |
| 2025/0217114 A1* | 7/2025 | Roper, Jr. .............. | G06N 20/00 |

* cited by examiner

*Primary Examiner* — Chuck O Kendall
(74) *Attorney, Agent, or Firm* — Lathrop GPM LLP

(57) ABSTRACT

A method includes receiving a request to generate a performance test script from a performance testing application. The request includes a test script type and a performance test scenario. An execution graph is constructed. The execution graph includes a multitude of nodes connected by a multitude of edges. The multitude of nodes is instantiated with a multitude of processing steps for generating the performance test script based on the performance test scenario and the test script type. The multitude of nodes are further connected by the multitude of edges. An edge connecting two nodes represents a transition condition for transitioning from a first processing step to a second processing step corresponding to the two nodes. The execution graph is executed to obtain the performance test script. The performance test script is transmitted to the performance testing application.

20 Claims, 6 Drawing Sheets

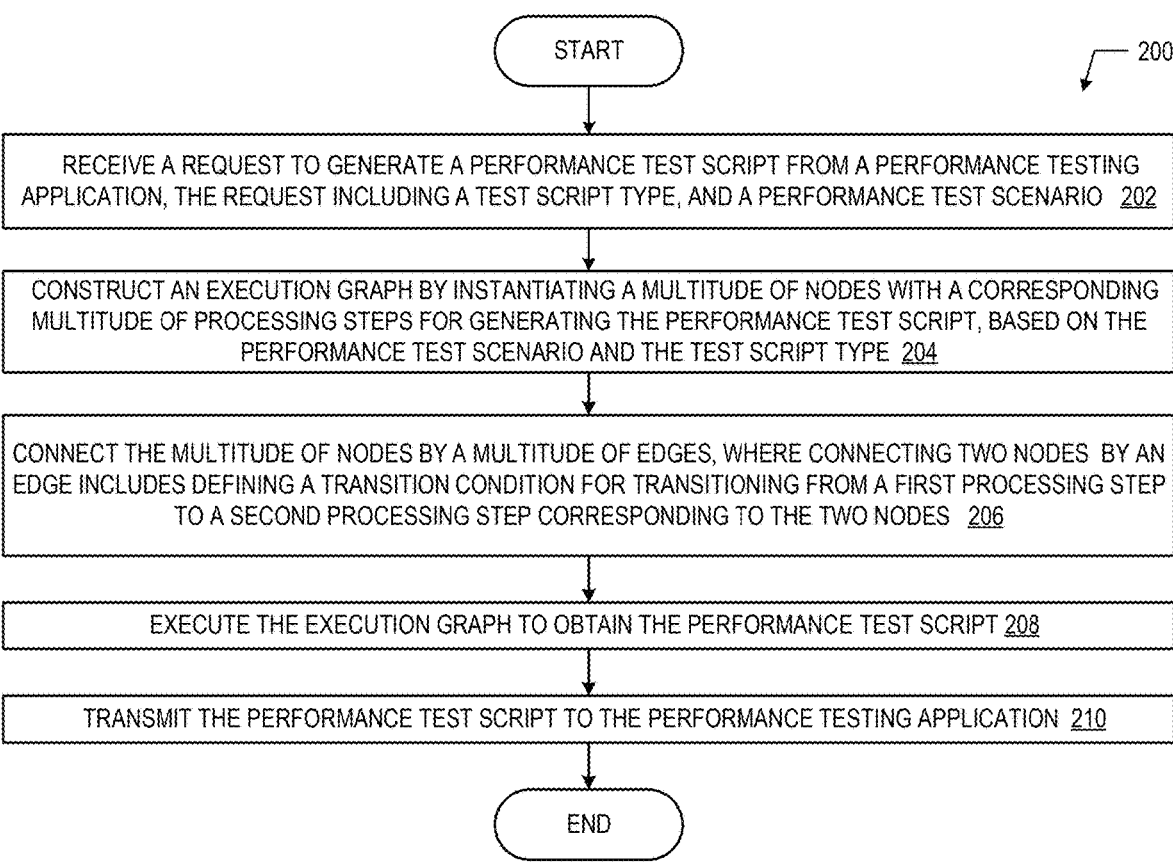

START

200

RECEIVE A REQUEST TO GENERATE A PERFORMANCE TEST SCRIPT FROM A PERFORMANCE TESTING APPLICATION, THE REQUEST INCLUDING A TEST SCRIPT TYPE, AND A PERFORMANCE TEST SCENARIO  202

CONSTRUCT AN EXECUTION GRAPH BY INSTANTIATING A MULTITUDE OF NODES WITH A CORRESPONDING MULTITUDE OF PROCESSING STEPS FOR GENERATING THE PERFORMANCE TEST SCRIPT, BASED ON THE PERFORMANCE TEST SCENARIO AND THE TEST SCRIPT TYPE  204

CONNECT THE MULTITUDE OF NODES BY A MULTITUDE OF EDGES, WHERE CONNECTING TWO NODES  BY AN EDGE INCLUDES DEFINING A TRANSITION CONDITION FOR TRANSITIONING FROM A FIRST PROCESSING STEP TO A SECOND PROCESSING STEP CORRESPONDING TO THE TWO NODES  206

EXECUTE THE EXECUTION GRAPH TO OBTAIN THE PERFORMANCE TEST SCRIPT 208

TRANSMIT THE PERFORMANCE TEST SCRIPT TO THE PERFORMANCE TESTING APPLICATION  210

END

*FIG. 2*

```
simulation: "ExampleLoadTest"
base_url: "https://api.example.com" # global base URL for requests
config:
  users: 50
  duration: 5m
  feeders:
    - type: csv
      file: "users.csv"
      alias: "userCreds" # will provide {{userCreds.username}},
{{userCreds.password}}
  scenarios:
    - name: "User Login and Fetch"
      flow:
        - transaction: "LoginTransaction"
          steps:
            - request:
                method: POST
                url: "/login"
                headers:
                  Content-Type: "application/json"
                body:
                  json:
                    username: "{{userCreds.username}}"
                    password: "{{userCreds.password}}"
                extract:
                  - json_path: "$.token"
                    var: "authToken"
                checks:
                  - status: 200
                  - body_contains: "Welcome"
          think_time: 2s # pause after login
        - transaction: "DataFetch"
```

```
          steps:
            - request:
                method: GET
                url: "/data"
                headers:
                  Authorization: "Bearer {{authToken}}"
                checks:
                  - status: 200
                  - response_time_lt: 1000 # response time less than 1000ms
load_profile:ramp_users: 50
  duration: 60s # ramp 50 users over 1 minute
  - hold_for: 4m # then hold load for 4 minutes
  - spike_users:
      count: 100 # spike to 100 users
      duration: 30s # for 30 seconds
  - step_users:
      increment: 10 # increment by 10 users...
      step_duration: 30s # every 30 seconds
      hold_duration: 2m # hold each step for 2 minutes
```

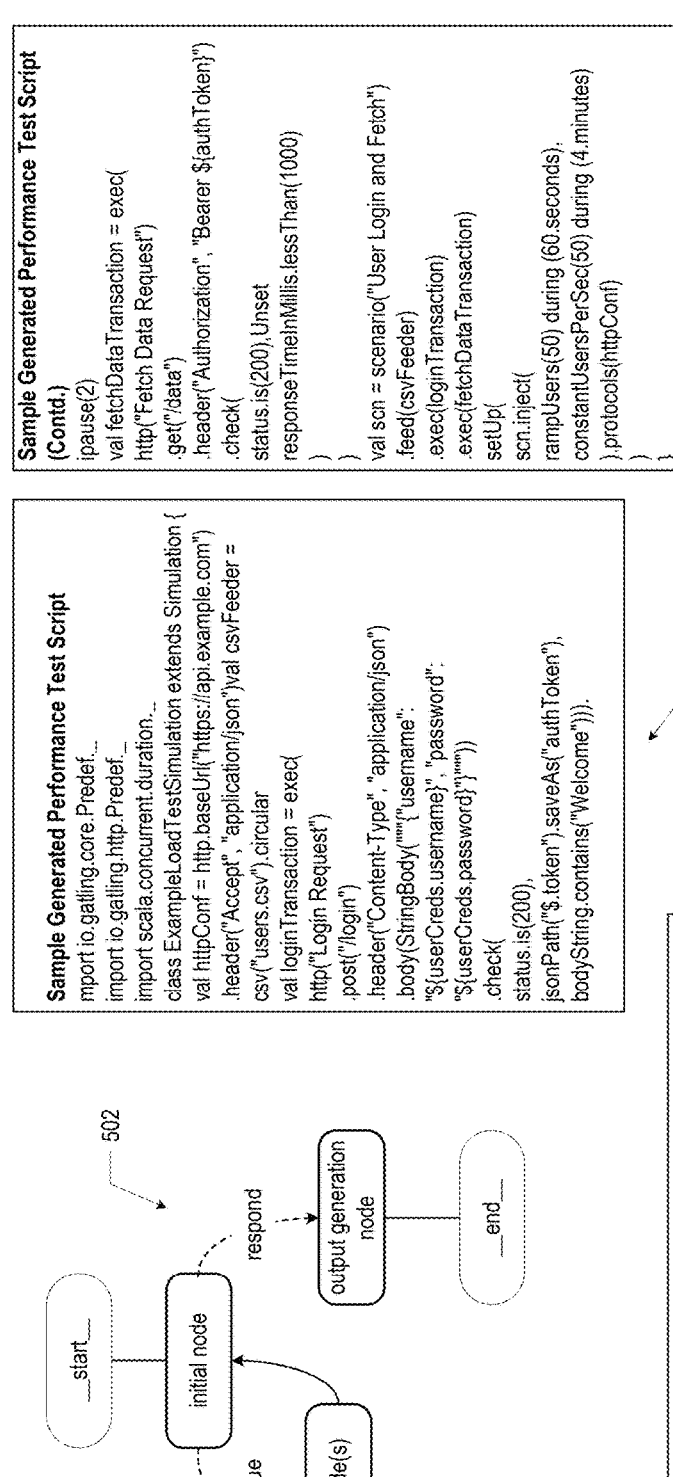

Sample Generated Performance Test Script

```
mport io.gatling.core.Predef._
import io.gatling.http.Predef._
import scala.concurrent.duration._
class ExampleLoadTestSimulation extends Simulation {
val httpConf = http.baseUrl("https://api.example.com")
.header("Accept", "application/json")val csvFeeder =
csv("users.csv").circular
val loginTransaction = exec(
http("Login Request")
.post("/login")
.header("Content-Type", "application/json")
.body(StringBody("""{"username":
"${userCreds.username}", "password":
"${userCreds.password}"}"""))
.check(
status.is(200),
jsonPath("$.token").saveAs("authToken"),
bodyString.contains("Welcome"))).
```

Sample Generated Performance Test Script (Contd.)

```
).pause(2)
val fetchDataTransaction = exec(
http("Fetch Data Request")
.get("/data")
.header("Authorization", "Bearer ${authToken}")
.check(
status.is(200), Unset
responseTimeInMillis.lessThan(1000)
)
)
val scn = scenario("User Login and Fetch")
.feed(csvFeeder)
.exec(loginTransaction)
.exec(fetchDataTransaction)
setUp(
scn.inject(
rampUsers(50) during (60.seconds).
constantUsersPerSec(50) during (4.minutes)
).protocols(httpConf)
)
}
```

504

502 start → initial node respond → output generation node continue tool node(s)

end

Sample Input Prompt Template

"""Create a versatile script converter that translates a given YAML configuration into various performance testing script input based on user selection. Ensure that the resultant scripts are ready to compile or execute directly within their respective environments.

Perform the following tasks:
1. Fetch instructions for generating the YAML configuration into {user_specified_performance_testing_tool}
2. Dry run the generated test request and fix any compilations errors.
3. Extract and return ONLY the raw code snippet from the previous response. Do not include any markdown formatting, explanatory text, or additional context.
YAML configuration provided: {yaml_configuration}"""

506

Sample input parsing step Prompt Template

"""Parse YAML configration from the provided input and create performance testing requests in the specified performance testing tool.

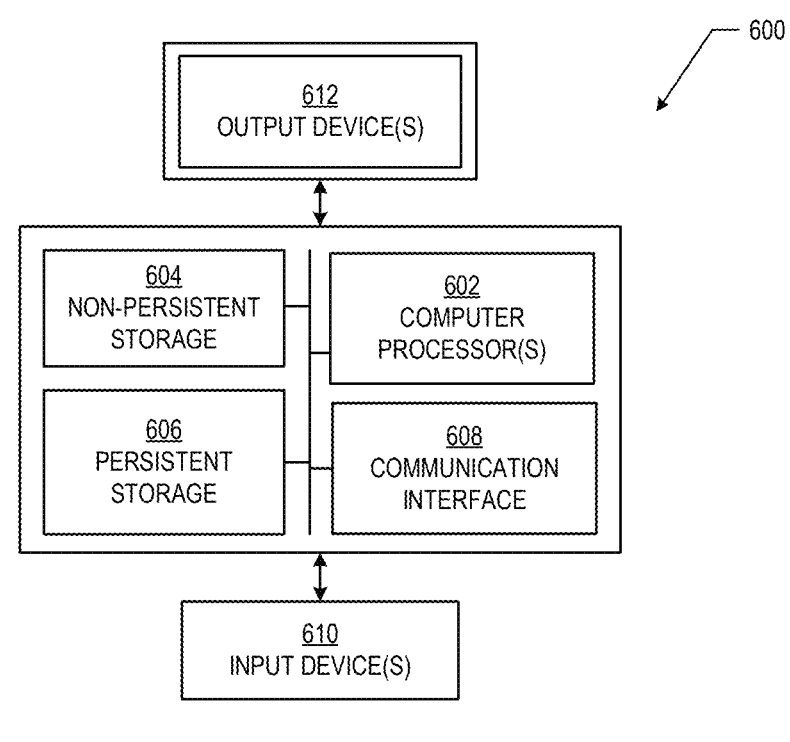
_FIG. 6A_
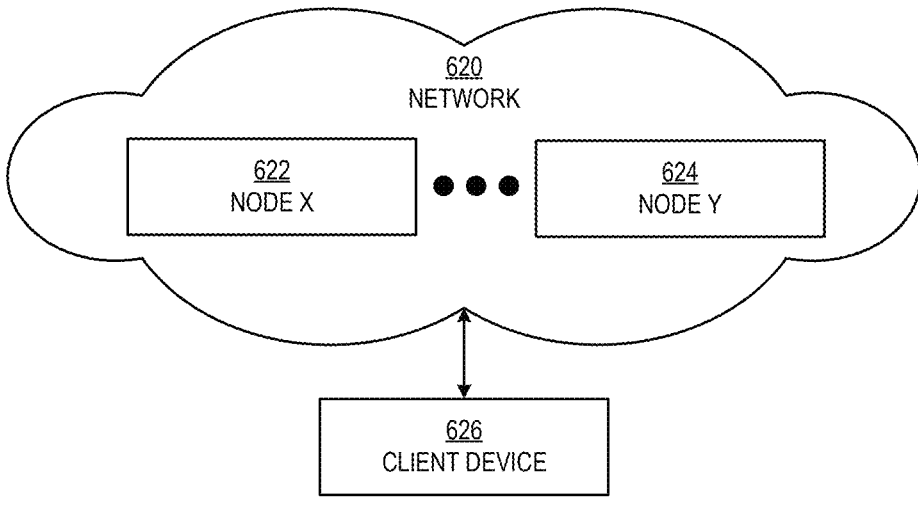
_FIG. 6B_

GENERATING PERFORMANCE TESTING SCENARIOS FROM PRODUCTION TRAFFIC DATA USING LARGE LANGUAGE MODELS

BACKGROUND

Performance testing is a phase within a software development lifecycle of a software application. Performance testing entails verifying and validating that software applications are operating with optimal functionality prior to the release and deployment of the software applications. The performance testing of software applications entails an accurate replication of a production scenario within a performance testing setting. For example, the replication may include replicating or simulating various network hops in the transmission of data.

In performance testing, features of the software application are tested. The testing of the features is dependent upon replication of operational parameters of a production environment. For example, the temporal and load conditions on the features need to mirror real-world usage, such as replicating similar concurrent user loads, replicating similar network latency, and replicating similar resource constraints between the test and production environment. Performance testing is performed by executing performance test scripts. A performance test script is a structured sequence of actions that simulates how a user interacts with an application or how the application communicates with underlying software services, under real-world load conditions. Performance test scripts may be frequently modified to mirror changes in sequences of actions, and changes in temporal and load conditions. Continuous manual modification may prolong development and testing durations, and further, may increase the susceptibility to human error, and fail to capture real-world usage patterns. Accelerated performance testing is performed in a time sensitive context.

SUMMARY

In general, in one aspect, one or more embodiments relate to a method. The method includes receiving a request to generate a performance test script from a performance testing application. The request includes a test script type and a performance test scenario. The method further includes constructing an execution graph. The execution graph includes a multitude of nodes connected by a multitude of edges. Construction of the execution graph includes instantiating the multitude of nodes with a multitude of processing steps for generating the performance test script based on the performance test scenario and the test script type. The multitude of nodes are further connected by the multitude of edges. An edge connecting two nodes represents a transition condition for transitioning from a first processing step to a second processing step corresponding to the two nodes. The method further includes executing the execution graph, to obtain the performance test script. The method further includes transmitting the performance test script to the performance testing application.

In general, in one aspect, one or more embodiments relate to a system. The system includes at least one computer processor, and a performance test script generator, executing on the at least one computer processor. The performance test script generator includes an AI agent. The performance test script generator is configured for receiving a request to generate a performance test script from a performance testing application. The request includes a test script type and a performance test scenario. The performance test script generator is further configured for constructing an execution graph. The execution graph includes a multitude of nodes connected by a multitude of edges. Construction of the execution graph includes instantiating the multitude of nodes with a multitude of processing steps for generating the performance test script based on the performance test scenario and the test script type. The multitude of nodes are further connected by the multitude of edges. An edge connecting two nodes represents a transition condition for transitioning from a first processing step to a second processing step corresponding to the two nodes. The performance test script generator is further configured for executing the execution graph, to obtain the performance test script. The performance test script generator is further configured for transmitting the performance test script to the performance testing application.

In general, in one aspect, one or more embodiments relate to a method. The method includes obtaining network traffic data between a multitude of user application instances and a multitude of target services. The method further includes extracting, from network traffic data, a multitude of service interaction endpoints and corresponding operation types, a set of consistent attributes of the service interaction endpoints and a set of variable attributes of the service interaction endpoints. The method further includes obtaining a set of performance test metrics from aggregating the network traffic data based on at least one consistent attribute of the set of consistent attributes. The method further includes grouping the multitude of service interaction endpoints by at least one of a common application session identifier and a common user identifier to obtain a set of interaction sessions. The method further includes ordering the set of interaction sessions based on timestamps of service interaction endpoints corresponding to individual interaction sessions to obtain a set of ordered interaction sessions. Each ordered interaction session includes a corresponding temporal sequence of the service interaction endpoints. The method further includes processing the set of ordered interaction sessions with a sequential pattern mining function to identify a subset of temporal sequences of service interaction endpoints as a multitude of performance test scenarios. The temporal sequences of service interaction endpoints have corresponding occurrence counts that satisfy a frequency threshold.

Other aspects of one or more embodiments will be apparent from the following description and the appended claims.

BRIEF DESCRIPTION OF DRAWINGS

FIG. 2 shows a flowchart of a method, in accordance with one or more embodiments.

FIG. 4 shows an example, in accordance with one or more embodiments.

FIG. 5 shows an example, in accordance with one or more embodiments.

FIGS. 6A and 6B show an example of a computing system, in accordance with one or more embodiments.

Like elements in the various figures are denoted by like reference numerals for consistency.

DETAILED DESCRIPTION

Figure 1:
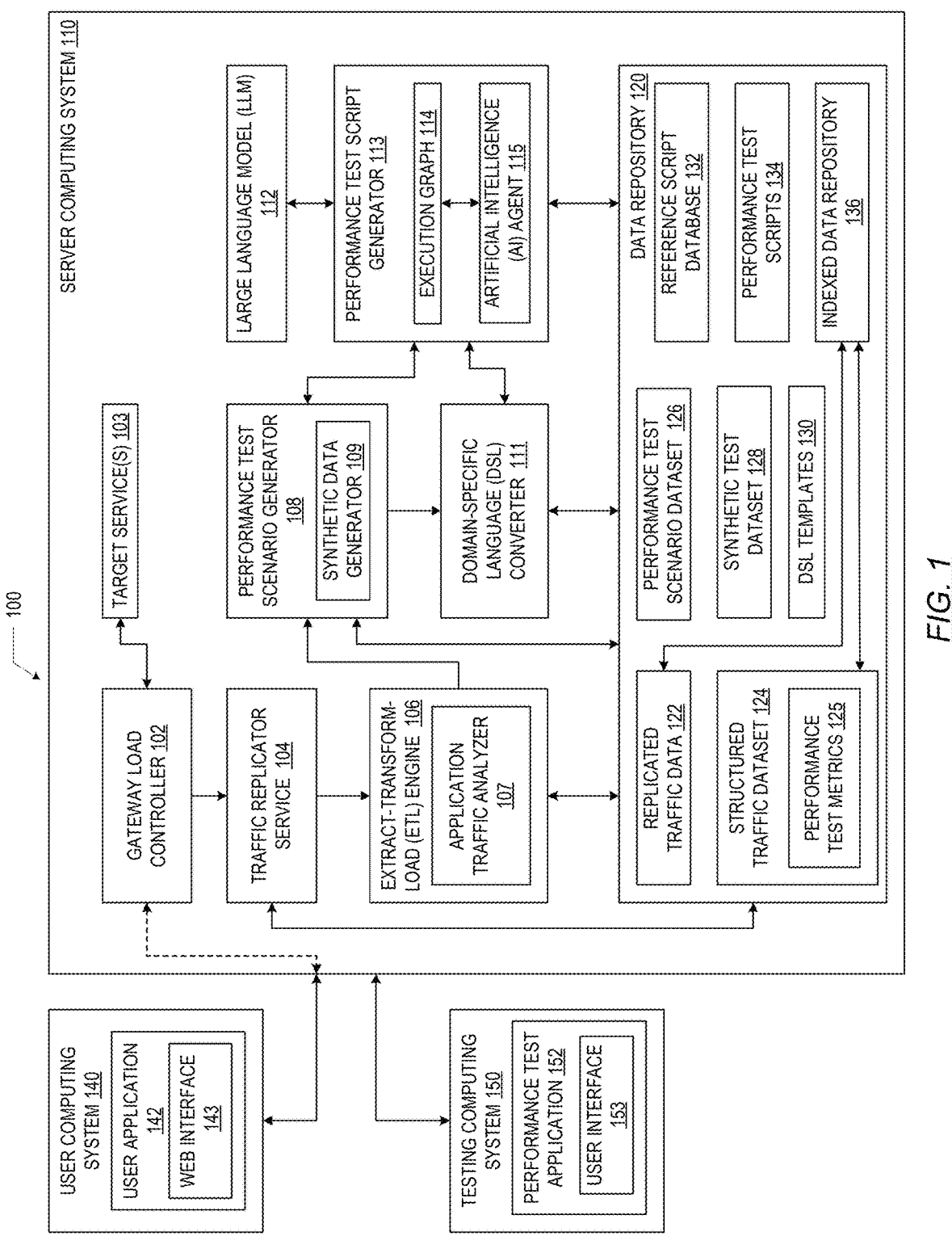
FIG. 1 shows a computing system, in accordance with one or more embodiments.

One or more embodiments are directed to creating performance tests that realistically simulate traffic conditions of how a user application interacts with a target service when executing in the production environment. By performing performance testing, improvements to one or both of the user application and target service may be identified and implemented. One or more embodiments involve a two-part solution as described below.

A first part entails generating performance test scenarios from real production network traffic data. The system captures raw application layer production traffic data. Application layer production traffic data refers to requests and responses between user application instances and target services. The captured raw data undergoes extract, transform, and load (ETL) processes to obtain structured data. The structured data is further analyzed to identify frequently occurring user interactions, and end-to-end tasks, or workflows. The analysis of the structure data is via the examination of consistent and variable characteristics of the structured data. The workflows are captured as performance test scenarios. Performance test scenarios refer to request and response patterns between user applications and target services, typically directed to a specific outcome, or accomplishing a multi-step task. In addition to performance test scenarios, performance test metrics are derived from the structured data. Performance test metrics refer to network traffic load conditions and frequency of occurrence of particular request-response patterns. The system captures real-time user interaction traffic patterns and behaviors in the performance test scenarios.

The generated performance test scenarios may be presented in a performance test application for selection by a performance engineer or developer. The performance engineer or developer may send a request via the performance test application for a performance test script to be generated. One or more performance test scenarios may be included as request parameters.

The second part of the solution entails processing the request received from the performance test application to generate a performance test script. To this end, the system implements an agentic execution framework. The agentic execution framework includes an execution graph, which is a graph-based execution model. The execution graph is orchestrated by an artificial intelligence (AI) agent in conjunction with a large language model (LLM), and/or other tools, to generate performance test scripts. The performance test scripts are generated using the performance test scenarios and may conform to diverse testing frameworks and/or diverse formats.

Upon receiving the request, a set of processing steps may be defined to generate a particular performance test script. Further, the execution graph may be constructed. The execution graph includes multiple nodes connected by multiple edges. The nodes represent the processing steps, and the edges represent transition conditions between the processing steps. In one or more embodiments, the AI agent may prompt the LLM to generate the set of processing steps, providing the request and request parameters as input. The execution graph is executed, resulting in automatic generation of the performance test script, and the performance test script is transmitted to the performance testing application. The performance test script is executed within the performance testing framework. The user application/target services may undergo revisions based on the results of the performance test(s) prior to deployment in a production environment.

By using performance test scenarios generated from production network traffic data, the performance test scripts may mirror real-world operational conditions, both in terms of network and load conditions, and in terms of frequently used features and workflows of the user application undergoing performance testing.

Attention is now turned to the figures. FIG. 1 shows a system (100), in accordance with one or more embodiments. The system (100) shown in FIG. 1 may include a server computing system (110). The server computing system (110) is one or more computer processors, data repositories, communication devices, and supporting hardware and software. The server computing system (110) may be in a distributed computing environment. The server computing system (110) includes a computer processor. The computer processor is one or more hardware or virtual processors which may execute computer readable program code that defines one or more applications, such as the gateway load controller (102), the target services (103), the traffic replicator service (104), the extract-transform-load (ETL) engine (106), the performance test scenario generator (108), the domain-specific language (DSL) converter (111), the large language model (LLM) (112), and the performance test script generator (113). An example of the computer processor is described with respect to the computer processor(s) (602) of FIG. 6A. Thus, the server computing system (110) is configured to execute one or more applications, such as the gateway load controller (102), the target services (103), the traffic replicator service (104), the ETL engine (106), the performance test scenario generator (108), the DSL converter (111), the LLM (112), and the performance test script generator (113). An example of a computer system and network that may form the server computing system (110) is described with respect to FIG. 6A and FIG. 6B.

The system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) includes a store of replicated traffic data (122). The replicated traffic data (102) may be generated by the traffic replicator service (104), in conjunction with the gateway load controller (102). The replicated traffic data (122) may include application layer network traffic data. Specifically, the replicated traffic data (122) may include application layer communication between one or more instances of the user application (142) and the target services (103). Application layer network traffic data refers to the information exchanged at the seventh layer of the open systems interconnection (OSI) model, namely, the application layer.

As a general overview, the OSI model is a conceptual framework developed by the International Organization for Standardization (ISO) to standardize the functions of a telecommunication or computing system into seven distinct layers. Each layer serves a specific role in the process of transmitting data across a network, from the physical transmission of bits to the interpretation of data by applications. The seven layers of the OSI model, from lowest to highest, include the physical layer at the lowest level, handling the transmission of raw bits over a physical medium (e.g., cables, radio). The next layer is the data link layer that manages node-to-node data transfer and error detection (e.g., Ethernet). The third layer is the network layer, handling routing and addressing (e.g., Internet Protocol (IP)). The fourth layer is the transport layer, ensuring reliable data transfer (e.g., Transmission Control Protocol (TCP), User Datagram Protocol (UDP)). The fifth layer is the session layer, managing sessions and controls dialogues between systems. The sixth layer is the presentation layer, entailing translation of data formats (e.g., encryption, compression). Finally, the seventh layer is the application layer, which interfaces directly with end-user applications and defines protocols for data exchange. Information in the application layer includes the actual content and structure of messages sent between software applications over a network, using application layer protocols. Examples of application layer protocols include Hypertext Transfer Protocol (Secure) (HTTP, HTTPS), File Transfer Protocol (FTP), Simple Mail Transfer Protocol (SMTP) and Domain Name System (DNS). In contrast to lower-layer traffic, which deals with routing, delivery, and error correction, application layer traffic reflects user-level interactions, such as API calls, web page requests, file uploads, or email transmissions. The format of the replicated traffic data (122) may be in a protocol buffers (protobuf) format. Protobuf is a language-neutral, platform-neutral, extensible mechanism for serializing structured data. Other formats may include JavaScript Object Notation (JSON), extensible Markup Language (XML), HTTP Archive (HAR), etc.

As used in the current specification, the terms "network traffic data" and "application layer network traffic data" are interchangeable and refer to the information exchanged at the seventh layer of the Open Systems Interconnection (OSI) model, namely, the application layer.

The data repository further includes a structured traffic dataset (124). The structured traffic dataset (124) includes application layer requests, responses and attributes extracted by the ETL engine (106) from the replicated traffic data (122). The structured traffic dataset (124) may include service interaction endpoints and corresponding operation types of application layer communication. A service interaction endpoint is a logical address or identifier at the application layer that represents a specific resource or functionality exposed by a service. The service interaction endpoint is the target of a user request. For example, in HTTP communications, the service interaction endpoint may be the Universal Resource Locator (URL) path (or endpoint) that identifies a resource (e.g., /api/login, /users/123/profile, /orders/checkout, etc.). The URL paths represent distinct points of interaction with a target service. The operation type refers to the semantic intent of the request, defined by the application layer protocol, and expressed in an application layer vocabulary of method names. For example, in HTTP communications, the HTTP methods GET, POST, PUT, DELETE, etc., are operation types. Thus, a service interaction endpoint and corresponding operation type in HTTP may have a format such as "GET /products/123." A service interaction endpoint and corresponding operation type may constitute an application layer request record.

The structured traffic dataset (124) may include consistent attributes of the application layer request records. Consistent attributes refer to attributes of application layer communications that generally are the same across diverse requests. In HTTP communications, consistent attributes may include HTTP endpoints and HTTP methods. These attributes include the specific resource accessed on the server (the URL path) and the action executed on such resources (e.g., GET for retrieval, POST for creation). Analysis of the frequency of particular service interaction endpoint-operation type pairs may facilitate identification of the most frequently used features of the user application. Another consistent attribute in HTTP communications may be HTTP response status, including error codes such as 200 and 404.

Analysis of HTTP response status attributes may facilitate the inclusion of representative error conditions in performance testing scenarios.

The structured traffic dataset (124) may include variable attributes of the application layer network traffic data. Variable attributes of application layer communications are generally variable among requests to the same endpoint. The variability is substantive, such as the specific data exchanged or contextual nuances of individual user interactions. Accordingly, the variable attributes of application layer communications may include request parameters. Request parameters may include key-value pairs. For example, in HTTP communications, the key-value pairs may be appended to the Universal Resource Locator (URL) as query parameters. Analyzing query parameter types and values may facilitate formulating test requests having realistic variations in data content. The variable attributes may further include request payloads. For example, in HTTP communications, for methods like POST and PUT, request payloads may encompass data transmitted to the server. The data may be in JavaScript Object Notation (JSON) or extended Markup Language (XML) formats. The variable attributes may further include request headers that convey additional information regarding the client or request, including content type, authentication tokens, and user agent details. The variable attributes may further include response payloads, including data returned from the server following a successful request. The response payload may include a requested resource or an outcome of an operation. Analyzing common response payloads may facilitate identifying data points for assertions during performance testing.

The structured traffic dataset (124) further includes performance test metrics (125). The performance test metrics (125) may be derived by the ETL engine (106) from the application request records. As a general overview, performance test metrics are quantitative measurements used to evaluate how a software system behaves under specific load conditions. Performance test metrics may include requests per second, which measures the number of client requests the system can handle in one second. Another performance test metric may be application programming interface (API) latency (e.g., expressed in percentiles), which captures the time it takes for an API to respond to a request. Response time, throughput, error rate, and resource utilization metrics such as CPU, memory, and network usage are additional examples of performance test metrics. Performance test metrics may be derived using tools like Wireshark®, Fiddler® to parse the application request records. The performance test metrics (125) may be used to parameterize and design realistic performance test scripts. For example, load profiles derived from requests per second and concurrency may be used to determine the number of virtual users or threads to be simulated and corresponding ramp up rates. Latency data may inform the pacing of user actions, to be included as realistic think times between interactions in the performance test script. Error rates and response time percentiles may be used to set validation rules or pass/fail thresholds within the performance test script. Additionally, patterns in the network traffic data, such as peak usage periods or sudden spikes, may guide the design of test durations and load variations.

The structured traffic dataset (124) may further be loaded into the indexed data repository (136). The indexed data repository (136) is a structured, searchable collection of application layer request records. Each request record (i.e., application layer request record) may include a service interaction endpoint and a corresponding operation type.

Further, additional metadata associated with each request record may include a timestamp, application session identifiers and user identifiers, response status, and payload size. The indexed data repository (136) is configured to support efficient querying, aggregation, and pattern discovery across large volumes of the application layer request records.

The data repository (120) further includes a performance test scenario dataset (126). The performance test scenario dataset (126) includes a multitude of performance test scenarios. A performance test scenario is a temporal sequence of service interaction endpoints and corresponding operation types. The sequence is ordered by timestamps of the service interaction endpoints. The service interaction endpoints of a performance test scenario may have a common identifier, such as an application session identifier, or a user identifier. The common identifier delineates a particular sequence of service interaction endpoints as the interactions of a user in a specific interaction session.

Notably, a performance test scenario may include temporal sequences of service interaction endpoints encompassing diverse timespans. Some performance test scenarios may be relatively short, spanning minutes, for example, user interactions such as browsing, form submissions, or completing specific tasks. In contrast, other performance test scenarios may extend over longer periods (e.g., days), for example, automated cron jobs, or background offline processes.

The data repository (120) further includes a synthetic test dataset (128). The synthetic test dataset (128) includes a multitude of field values generated by a synthetic data generation tool. The synthetic data generation tool may be used by a synthetic data generator (109) included in the performance test scenario generator (108).

One aspect of performance testing may entail the incorporation of dynamic data having data dependencies that emulate "real-world" production data into performance test scenarios. To this end, certain data fields may be identified in the variable attributes of the structured traffic dataset (124). The data fields may be frequently occurring/recurring data elements across multiple performance test scenarios. Synthetic data generation techniques may be employed to generate a large volume of test data corresponding to the frequently occurring/recurring data fields. The large volume of test data may be known as synthetic data. In performance testing, synthetic data may be used to emulate the data types, formats, and statistical distributions observed in production data. Further, synthetic data may be substituted for production data for compliance with data privacy and governance standards, while maintaining data integrity and realism.

Thus, the synthetic test dataset (128) includes synthetic field values corresponding to data fields identified from among the variable attributes of the structured traffic dataset (124). The data fields may be frequently occurring/recurring data fields across multiple performance test scenarios.

The data repository (120) further includes a data store of DSL templates (130). The DSL templates (130) are documents or sections of documents encoded with performance test scenarios. A DSL template may include multiple entries. An entry may correspond to an individual service interaction endpoint of the performance test scenario. The entry may further include other entries corresponding to diverse attributes (consistent and variable attributes), the operation type, and metadata of the service interaction endpoint. The DSL templates (130) may be in a machine-readable and human-readable format, comprehendible by LLMs. Some example formats include XML, JSON, YAML Ain't Markup Language (YAML), etc. The DSL templates (130) may include documents encoding complete performance test scenario sequences of service interaction endpoints, corresponding operation types, entries for data fields of the service interaction endpoints, and corresponding synthetic field values. The DSL templates (130) may further include performance test metrics for the performance test scenarios. An example of a DSL template is shown in FIG. 4.

The DSL templates (130) may further include DSL template entries encoding field placeholders. DSL template entries refer to specifically defined sections of a DSL template document. Notably, DSL template entries may not be complete performance test scenario template documents. For example, a YAML template entry may define field placeholders for frequently occurring data fields as queryParams: product_id: "{{product_id}}"; user_id: "{{user_id}}." In this example, {{product_id}} and {{user_id}} are field placeholders corresponding to frequently occurring data fields product_id and user_id. The YAML template entry may be incorporated into a performance test scenario named "Get Toaster Product Info," which may have entries for request type, URL, etc. In one or more embodiments, the DSL templates are generated by the DSL converter (111).

The data repository (120) further includes a reference script database (132). The reference script database is a data store including a multitude of performance test scripts. A (reference) performance test script may be directed to, or customized for, a specific performance testing framework. Performance testing frameworks are software tools designed to simulate user activity and measure how systems behave under load, stress, or varying conditions. These frameworks may be used to identify performance bottlenecks, verify scalability, and validate system reliability. Performance testing frameworks may be code-based, using domain-specific languages to define performance test scripts. For example, Gatling is a performance testing framework that uses performance test scripts written in Scala. JMeter is an example of a GUI-based performance testing framework via visual interfaces. K6 is a performance testing framework using performance test scripts in JavaScript® scripting language. Locust is an example of a performance testing framework using Python code for performance test scripts. Thus, the reference script database (132) may include reference performance test scripts in diverse formats and languages. Some examples of data stores used for the reference script database (132) include vector stores, indexed data repositories, etc.

The data repository (120) further includes performance test scripts (134). The performance test scripts (134) are a collection, or catalog, of LLM-generated performance test scripts. The performance test scripts (134) are generated by the artificial intelligence (AI) agent (115) using the LLM (112). The performance test scripts (134) constitute the results, or generated output, of various iterations of executing the method of FIG. 2.

The server computing system (110) includes a gateway load controller (102). The gateway load controller (102) functions as an ingress point for all external requests directed towards the backend services. The gateway load controller (102) performs functions of request routing, authentication protocols, rate limitation mechanisms, and security enforcement. The gateway load controller (102) further serves to distribute incoming network traffic across multiple instances of a particular target service. Thereby, the gateway load controller (102) serves to mitigate the risk of overload on any single instance, facilitating scalability, and availability. In one or more embodiments, the gateway load controller (102) may be particularly configured to operate on network traffic at layer 7 (application layer) of the Open Systems Interconnection (OSI) model. That is, the gateway load controller (102) may capture network traffic data occurring at layer 7. One example of layer 7, or application layer network traffic data is communication in the Hypertext Transfer Protocol (HTTP).

The server computing system (110) further includes a traffic replicator service (104). The traffic replicator service (104) captures production traffic data by monitoring application layer network traffic data in conjunction with the gateway load controller (102) between user applications and target services. The traffic replicator service (104) further records, or replicates, user requests, application responses, and communication protocols. Thus, the traffic replicator service (104) "mirrors" network traffic data originating from a production environment. A representative dataset of real-world user interactions with a software application may thus be obtained. The representative dataset reflects live production traffic characteristics. Further, performance indicators such as transactions per second, latency, and throughput may be derived from the replicated network traffic data.

Thus, the gateway load controller (102) and the traffic replicator service (104) operate in conjunction to generate extensive datasets from the capture of application layer network traffic data in production environments. Potential generation rates may scale to millions of requests per minute, hour, or day depending on system throughput. The application layer network traffic data may be in the protobuf raw format.

The server computing system (110) further includes an ETL engine (106). The ETL engine (106) extracts and converts application layer network traffic data in the protobuf raw format into representations suitable for input to, and processing by, LLMs. The acquired application layer network traffic data is analyzed to comprehend the application-level interactions with the target services, and operational characteristics of the server computing system (110) thereof. Particularly, detailed information pertaining to user requests, application responses, and the specific protocols being employed may be extracted from the application layer network traffic data. This extracted information may be serialized into a dataset, suitable for LLM-based test scenario generation of authentic performance testing scenarios, namely, the structured traffic dataset (124). More particularly, the ETL engine (106) may extract service interaction endpoints and corresponding operation types from the application layer network traffic data as application layer request records. Further, the ETL engine (106) may characterize consistent attributes and variable attributes of application layer communications. The ETL engine (106) may tag the application layer request records with metadata, such as timestamps, application session identifiers, and user identifiers. Further, the structured traffic dataset (124) may be indexed by the ETL engine (106) into the indexed data repository (136).

The ETL engine (106) further includes an application traffic analyzer (107). The application traffic analyzer (107) is configured to invoke a search engine tool (for example, Elasticsearch), to search the indexed data repository (136). The application traffic analyzer (107) may use the search engine tool to aggregate application layer request records based on diverse consistent attributes of the application layer request records. The aggregated request records may further be analyzed to identify network traffic patterns. Further, performance test metrics (125) may be derived from the aggregated request records.

The server computing system (110) further includes a performance test scenario generator (108). The performance test scenario generator (108) is software or application-specific hardware, which, when executing on the computer processor, processes the structured traffic dataset (124) and performance test metrics (125) to generate one or more performance test scenarios. The performance test scenario generator (108) may perform multiple operations on the structured traffic dataset (124), including parsing the structured traffic dataset (124) to extract service interaction endpoints and corresponding operation types. The performance test scenario generator (108) may group the extracted service interaction endpoints by user identifiers or application session identifiers into interaction sessions. The performance test scenario generator (108) performs diverse operations on the interaction sessions, resulting in the generation of performance test scenarios. The operations performed by the performance test scenario generator (108) are described in detail in reference to the method of FIG. 3.

The performance test scenario generator (108) further includes a synthetic data generator (109). The synthetic data generator (109) generates synthetic field values as synthetic test data for the performance test scenarios. In one or more embodiments, the synthetic data generator (109) may use synthetic data generation tools, for example, Faker, to generate synthetic data that matches the data types, formats and statistical distributions observed in real-world data of the application layer request records.

The server computing system (110) further includes a DSL converter (111). The DSL converter (111) is software or application-specific hardware, which, when executing on the computer processor, encodes performance test scenarios into documents in diverse formats, for example, JSON, XML, or YAML documents. The documents are referred to as DSL templates.

As a general overview, DSL converters are tools that translate code, or instructions written in one domain-specific language (DSL) into another language. The output language may be another DSL, a general-purpose programming language, a natural language description, etc. A DSL is a programming or scripting language tailored to one or more specific application domains. DSLs may be optimized for particular tasks. For example, SQL is a domain-specific language for querying databases, HTML is a domain-specific language for structuring web content, etc.

The DSL converter (111) may use one or more standardized template to map the data of the performance test scenarios to the DSL template. Thus, the DSL templates may be considered to be instances of the standardized template, configured with data obtained from corresponding performance test scenarios. The DSL template may include multiple entries capturing the multiple elements of a performance test scenario. In one or more embodiments, the DSL converter (111) may use the structured traffic dataset (124) and the performance test scenario dataset (126) to generate the corresponding DSL templates in YAML (YAML Ain't Markup Language) format. Other formats are possible. The DSL converter (111) may be further configured to include specific test cases and conditions in the domain-specific documents. A detailed description of the operation of the DSL converter (111) is provided in reference to the method of FIG. 3.

The server computing system (110) further includes a performance test script generator (113). The performance test script generator (113) is software or application-specific hardware, which, when executing on the computer processor, essentially performs the method of FIG. 2. The performance test script generator (113) is configured to transform performance test scenarios obtained from DSL templates into performance test scripts for diverse performance testing frameworks. The performance test script generator (113) interprets structured representations of performance test scenarios included in the DSL template, and user instructions, and/or input received from the performance testing application. Based on the interpretation, the performance test script generator (113) performs automated generation of performance test scripts. In one or more embodiments, the performance test script generator (113) may implement an agentic execution framework. The automated generation of performance test scripts from the user inputs received is performed via the agentic execution framework.

In the agentic execution framework, an artificial intelligence (AI) agent coordinates modular, stateful execution of multiple processing steps, using a graph-based execution model. The multiple processing steps, when executed, accomplish the task of automated generation of performance test scripts. Notably, the multiple processing steps constitute the runtime logic for generating a performance test script for a particular testing framework from one or more performance test scenarios. The multiple processing steps are described in further detail in reference to the method of FIG. 2. The AI agent is shown in FIG. 1 as the AI agent (115). The graph-based execution model is shown in FIG. 1 as the execution graph (114). The execution graph (114) includes a multitude of nodes and a multitude of edges. The nodes of the execution graph (114) represent the processing steps. The edges represent transition conditions between the processing steps that define the control flow and data flow of the execution graph (114). The agentic execution framework supports dynamic decision-making and iterative refinement of outputs based on intermediate results. In one or more embodiments, the execution graph (114) may include an "initial" node, one or more "tool" nodes and one or more "output generation" nodes. An example of the execution graph (114) is shown in FIG. 5. The performance test script generator (113) further employs a reasoning and action (ReACT) methodology in the agentic execution framework. The ReACT methodology is a structured reasoning methodology that guides how an AI agent and underlying LLM "thinks" step-by-step to solve complex tasks. The ReACT methodology alternates between interpreting user input and executing corresponding processing steps. Thus, the ReACT methodology facilitates the decomposition of complex instructions (e.g., the initial prompt to the LLM) into actionable steps (e.g., the set of processing steps) and intermediate validations (e.g., the transition conditions). An example of the agentic execution framework is LANGGRAPH®. LANGGRAPH® is an execution graph framework within which AI agents orchestrate modular processing steps and tools, based on dynamic transition logic, and structured reasoning methodologies.

The performance test script generator (113) further includes an AI agent (115). The AI agent (115) is software or application-specific hardware that manages reasoning, decision-making and tool invocations of the performance test script generator (113). The AI agent (115) coordinates and orchestrates diverse functions and tools invoked by the performance test script generator (113) in the process of generating performance test scripts. As a general overview, AI agents are configured to make decisions based on inputs and internal state and take actions to achieve specific goals. AI agents use LLMs to reason, plan, and generate responses. AI agents may interact with LLMs by programmatically prompting the LLMs.

Thus, within the agentic execution framework of the performance test script generator (113), the AI agent (115) may maintain an execution state that evolves as the execution graph (114) is traversed. As the various nodes of the execution graph (114), are traversed during execution, the AI agent (115) may use an LLM and/or other functions and tools to perform the corresponding processing steps. Specifically, the AI agent (115) may use the LLM to interpret user input, decide the next step or choose the next tool to invoke, or generate the output.

The server computing system (110) further includes an LLM (112). LLMs are advanced AI models having transformer architecture, trained on vast corpora in diverse natural languages. LLMs may include billions of parameters that are adjusted during training. The natural language capabilities of LLMs may include parsing and interpret questions, commands, and context. LLMs have generative capabilities, such as writing essays, code, fiction, emails, etc. LLMs may translate text between languages, summarize long documents into key points, and answer questions factually or inferentially. Further, LLMs may perform logical deduction, and multi-step problem solving. When integrated with AI agents, LLMs may be used to programmatically invoke Application Programming Interface (API) calls of other software tools and utilities, for example, search engines, document retrieval tools, database querying etc. Examples of LLMs include CHATGPT® from OPENAIR, LLAMAR from Meta, CLAUDE® from Anthropic, etc.

The system (100) includes a user computing system (140). The user computing system (140) may be considered remote or local. A remote user computing system may be operated by a third-party (e.g., an end user of a chatbot) that does not control or operate the system of FIG. 1. Similarly, the organization that controls the other elements of the system of FIG. 1 may not control or operate the remote user computing system. Thus, a remote user computing system may not be considered part of the system of FIG. 1. In contrast, a local user computing system is operated under the control of the organization that controls the other components of the system of FIG. 1. Thus, a local user computing system may be considered part of the system of FIG. 1.

The user computing system (140) is a computing system used by a user to submit a user query. The user computing system (140) may include a display for displaying the web interface (143) of a user application (142) and an input device for receiving input from the user. The user computing system (140) may further include a network interface for connecting the user computing system (140) to the server computing system (110). The user computing system (140) may be configured to execute the user application (142) with the web interface (143). In one or more embodiments, the user application (142) may be a web-based client application, operating within a web browser. Other embodiments of the user application (142) may include native desktop applications, mobile applications, remote desktop clients, etc. The user application (142) may be serviced by one or more target services (103) executing on the server computing system (110). For example, the target service (103) may be an office productivity based application (e.g., OFFICE 365®), a graphics based application, a financial application (e.g., QUICKBOOKS®), a multi-media application, or other type of application. The user application (142) may be a candidate for performance testing.

The system (100) includes a testing computing system (150). The testing computing system (150) is used by a performance test engineer, or developer. The testing computing system (150) may include a display for displaying the user interface (153) of a performance test application (152) and an input device for receiving input from the user. The testing computing system (150) may further include a network interface for connecting the testing computing system (150) to the server computing system (110). The testing computing system (150) may be configured to execute the performance test application (152) with the user interface (153). The performance test engineer or developer may select a performance test scenario and a testing framework type or test script type presented in the user interface (153) of the performance test application (152). The performance test application (152) may transmit the performance test scenario and the testing framework type/test script type as input parameters of a request to generate a performance test script. The performance test script generator (113) may receive the request from the performance test application (152).

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart 200 of a method for generating a performance test script in response to a request, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined or omitted, and at least some of the steps may be executed in parallel. Furthermore, the steps may be performed actively or passively.

In one or more embodiments, the method of FIG. 2 may be performed in a performance test script generation phase. The performance test script generation phase may be triggered by a performance engineer selecting one or more pre-defined performance test scenarios in a performance test application and sending a request for a performance test script to be generated using the performance test scenario. The method of generating the one or more pre-defined performance test scenarios is described in further detail with reference to the method of FIG. 3.

In Block 202, a request is received to generate a performance test script from a performance testing application. The request may include a test script type, and a performance test scenario, as request parameters. The test script type may identify the testing framework within which the performance test script may be executed. In certain embodiments, the test script type may identify a machine readable and understandable format, interpretable by a particular testing framework. For example, the testing framework may be a Gatling testing framework. The performance test script interpretable by the Gatling testing framework may be a Scala script. Thus, the test script type parameter may identify the testing framework (e.g., Gatling), and/or the format (e.g., Scala). The performance test scenario may be provided in the request as an identifier of a particular known performance test scenario. In one or more embodiments, a performance testing application may present a performance test engineer with a set of performance test scenarios. For example, the performance test scenarios may include frequently performed workflows of a user application, such as logging in, purchasing an item, paying a bill, generating an invoice, scheduling an event, etc. Moreover, the performance test scenarios may be pre-defined, or previously generated performance test scenarios. The previously generated performance test scenarios may be obtained from analyzing network traffic data between the user application and target services. In one or more embodiments, the performance test input generator may receive the request from the performance testing application.

In Block 204, an execution graph is constructed by instantiating a multitude of nodes with a corresponding multitude of processing steps for generating the performance test script, based on the performance test scenario and the test script type. In one or more embodiments, an execution graph may be constructed. Constructing the graph may include instantiating the multitude of nodes with the corresponding multitude of processing steps. In one or more embodiments, the AI agent may programmatically prompt the LLM to generate the multitude of processing steps. An example of a prompt sent by the AI agent to the LLM is shown in FIG. 5. Furthermore, the LLM may generate the multitude of processing steps and transition conditions for transitioning between processing steps.

In Block 206, the multitude of nodes are connected by a multitude of edges. Connecting two nodes by an edge includes defining a transition condition for transitioning from a first processing step to a second processing step corresponding to the two nodes. Thus, the edges between the nodes of the execution graph are mapped to transition conditions defining the progress of the execution of the execution graph from the first processing step to the second processing step corresponding to the two nodes.

The processing steps of Block 204 may include an initial processing step, one or more intermediate action steps, and an output generation step. In one or more embodiments, the performance test script generator may instantiate the AI agent and/or invoke the AI agent to execute the execution graph. The AI agent, upon instantiation, may perform the initial processing step, represented by an "initial" node of the execution graph. Subsequently, the AI agent may check for one or more transition conditions, such as a success/failure of the initial processing step. For example, an initial processing step may be to retrieve a DSL template, corresponding to the performance test scenario specified in the input from the performance test application, from the data repository. If the retrieval operation is not successful, the AI agent may terminate execution of the execution graph. Based on the transition conditions, the AI agent may perform the one or more intermediate action steps as a subsequent processing step. In similar manner, the AI agent may check for transition conditions after performing an intermediate action step. Based on the transition conditions, the AI agent may continue performing further intermediate action steps or may perform an output generation step as a subsequent processing step.

The intermediate action steps may be represented by "tool" nodes of the execution graph. In one or more embodiments, the tool nodes may represent diverse functions of the AI agent. The diverse functions may entail programmatically prompting the LLM to perform a task, programmatically configuring the LLM, or other business logic. In other embodiments, the tool nodes may represent processing steps performed by software tools invoked by the AI agent. For example, the independent software tools may include document retrieval tools for retrieval augmented generation, search engines for performing searches in vector databases, validation modules, etc. An example of the execution graph is shown in FIG. 5.

Specific processing steps may be defined for generating a performance test script for a performance test scenario in a format indicated by the test script type. In one or more embodiments, the specific processing steps may include an input parsing step. The input parsing step may include obtaining a DSL template corresponding to the performance test scenario. The input parsing step may further include parsing the DSL template to obtain a temporal sequence of service interaction endpoints. In one or more embodiments, the AI agent may invoke a search tool or function to retrieve the DSL template from the DSL templates in the data repository. Further, the AI agent may prompt the LLM to parse the DSL template to retrieve the temporal sequence of service interaction endpoints and corresponding operation types, consistent and variable attributes, metadata, etc. The LLM may parse the DSL template and return the temporal sequence of service interaction endpoints to the AI agent. An example prompt for parsing the DSL template that the AI agent may use to programmatically invoke the LLM is shown in FIG. 5.

The processing steps may further include a reference retrieval step. The reference retrieval step may include retrieving a reference test script corresponding to the test script type or performance testing framework (e.g., Scala or Gatling, XML or JMeter, etc.). In one or more embodiments, the reference test scripts may be retrieved from a reference script database in the data repository. More particularly, the AI agent may invoke a document retrieval tool to retrieve one or more reference test scripts from the reference script database.

The processing steps may further include a script generation step. The script generation step may include instantiating the performance test script based on the reference test script and populating the performance test script with the temporal sequence of service interaction endpoints. In one or more embodiments, the AI agent may perform the script generation step in conjunction with the LLM. For example, the AI agent may programmatically prompt the LLM to generate a performance test script in the specific format of the script type specified in the user input. Further, the AI agent may include instructions to populate the performance test script in accordance with the DSL template that encodes the performance test scenario specified in the user input.

In one or more embodiments, the AI agent may configure the LLM with certain parameters to ensure that the LLM generates non-deterministic or non-random output. For instance, the LLM temperature may be set to 0, to ensure non-deterministic output. Further, the top-p parameter may be set to 1, to ensure that full probability mass is considered, without truncation. The processing steps may further include the output generation step, including returning the performance test script. In one or more embodiments, the performance test script may be a fully executable script in the domain-specific language of the specified testing framework received from the performance test application.

Upon receiving the performance test script from the LLM in one or more embodiments, the AI agent may further invoke a validation tool or function to verify and validate the performance test script. Responsive to the generated performance test script passing the validation/verification checks, the AI agent may transmit the performance test script as a response to the request from the performance test application.

Thus, the performance test script generator constructs the execution graph and orchestrates, in conjunction with the AI agent, the execution of the execution graph. Accordingly, in Block 208, the execution graph is executed to obtain the performance test script. In the course of execution, the AI agent may perform the processing steps described herein in the manner described herein. In Block 210, the performance test script is transmitted to the performance testing application.

In one or more embodiments, the performance test script may be executed within the particular performance testing framework to which the performance test script is directed, or customized. An error report may be generated. The error report may be used to implement one or more revisions to the user application and/or target services. The revised user application and/or target services may be deployed in the production environment.

Figure 3:
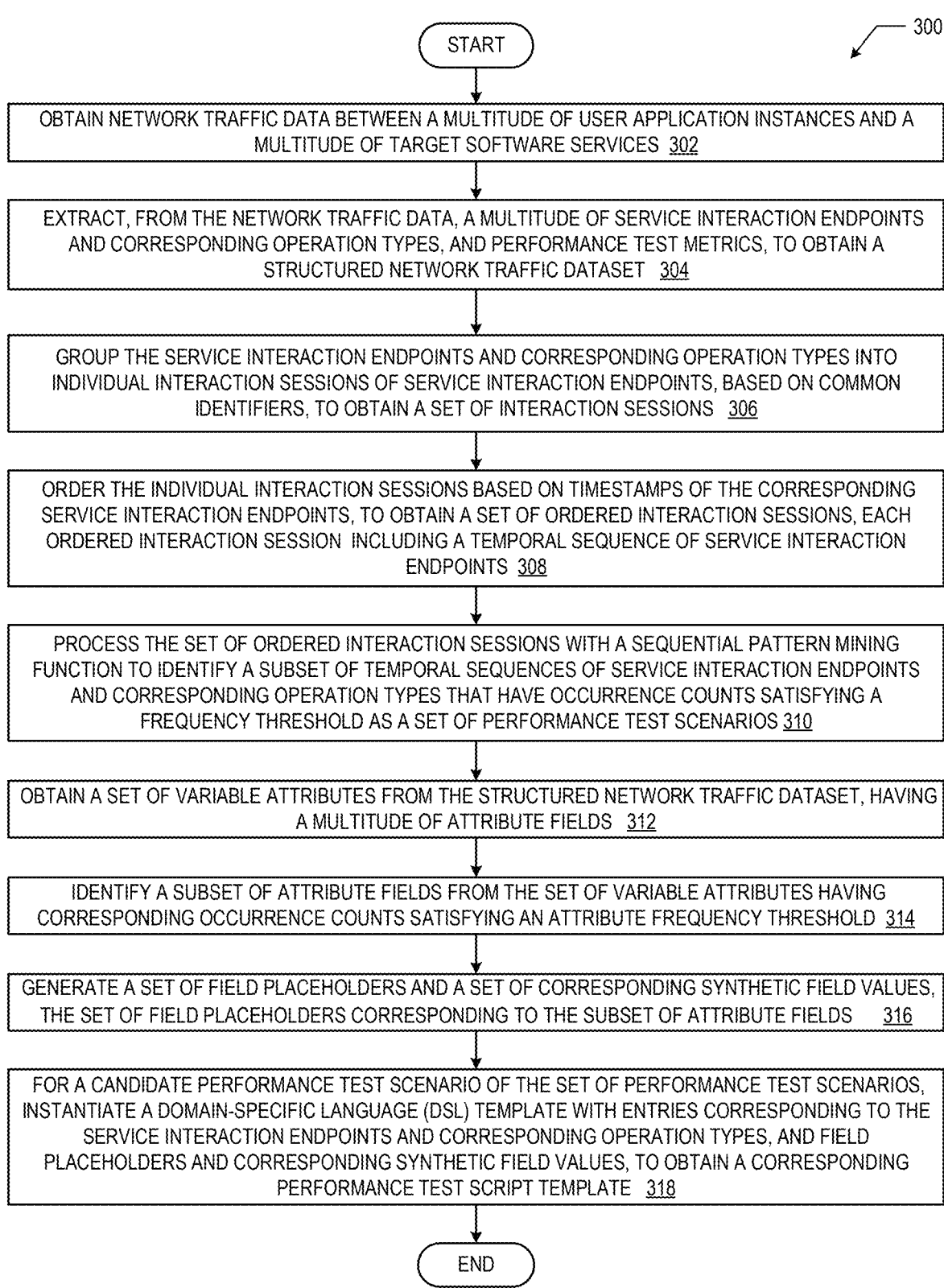
FIG. 3 shows a flowchart of a method, in accordance with one or more embodiments.

FIG. 3 shows a flowchart 300 of a method for analyzing network traffic data between a user application and target services to obtain a multitude of performance test scenarios. The method of FIG. 3 may be implemented using the system of FIG. 1 and one or more of the steps may be performed on or received at one or more computer processors. While the various steps in the flowchart 300 are presented and described sequentially, at least some of the steps may be executed in different orders, may be combined or omitted, and at least some of the steps may be executed in parallel. Furthermore, the steps may be performed actively or passively.

In one or more embodiments, the method of FIG. 3 may be performed in a performance test scenario generation phase. Network traffic data may undergo ETL processing to obtain the structured traffic dataset. The structured traffic dataset may undergo further processing to obtain performance test scenarios, encoded in DSL templates. The performance test scenarios may be presented as pre-defined performance test scenarios in the performance test application.

In Block 302, network traffic data is obtained between a multitude of user application instances and a multitude of target services. In one or more embodiments, obtaining the network traffic data may entail sampling the network traffic data between the user application instances and the target services by the gateway load controller. Further, the traffic replicator service may generate a copy of the sampled network data and add the sampled data to the replicated traffic data store in the data repository. In one or more embodiments, the network traffic data may include sampling application layer requests and responses between the user application and the target services. An example of application layer requests and responses is HTTP requests and responses (e.g., HTTP/GET, HTTP/POST, etc.).

The steps of Blocks 304-318 constitute the processing of the network traffic data to generate a multitude of performance test scenarios of the multitude of user application instances and the multitude of target services.

In Block 304, a multitude of service interaction endpoints and corresponding operation types, and performance test metrics is extracted, from the network traffic data, to obtain a structured traffic dataset. In one or more embodiments, the ETL engine may extract a multitude of service interaction endpoints and corresponding operation types from the network traffic data. Further, a set of consistent attributes and a set of variable attributes may be obtained from the multitude of service interaction endpoints and corresponding operation types. Furthermore, the network traffic data may be aggregated based on at least one consistent attribute of the set of consistent attributes to obtain aggregated traffic data. A set of performance test metrics may be determined from the aggregated traffic data. Additionally, the multitude of service interaction endpoints and corresponding operation types, the set of consistent attributes, the set of variable attributes, and the set of performance test metrics, may be added to a structured network traffic dataset in the data repository.

In Block 306, the service interaction endpoints and corresponding operation types may be grouped into individual interaction sessions of service interaction endpoints, based on common identifiers, to obtain a set of interaction sessions. In one or more embodiments, the common identifiers may include an application session identifier. The application session identifier may correspond to an application layer request-response session between a user application instance and the one or more target services. Another common identifier may be a user identifier corresponding to a user of the user application. In one or more embodiments, the structured network traffic dataset may be parsed to extract the multitude of service interaction endpoints and corresponding operation types. The multitude of service interaction endpoints and corresponding operation types may be grouped into at least one interaction session. The at least one interaction session may include a subset of service interaction endpoints and corresponding operation types. The subset of service interaction endpoints and corresponding operation types may have at least one of a common application session identifier and a common user identifier. The set of interaction sessions may be obtained in this manner.

In Block 308, the individual interaction sessions of the set of interaction sessions may be ordered, based on timestamps of the corresponding service interaction endpoints, to obtain a set of ordered interaction sessions. Each ordered interaction session may include a temporal sequence of service interaction endpoints. In one or more embodiments, the set of interaction sessions may be obtained from the structured network traffic dataset by performing the steps of Block 306. Further, for at least one interaction session of the set of interaction sessions, operations may be performed, including ordering the at least one interaction session, to obtain at least one ordered interaction session. The ordering of the at least one interaction session may be based on timestamps corresponding to individual service interaction endpoints of the at least one interaction session. Thus, the at least one ordered interaction session may include a temporal sequence of the individual service interaction endpoints. In a similar manner, other interaction sessions of the set of interaction sessions may be ordered, to obtain a set of ordered interaction sessions. Thus, a set of ordered interaction sessions may be obtained from the structured network traffic dataset. Each ordered interaction session may include a temporal sequence of service interaction endpoints and corresponding operation types.

In an example implementation, the ordered interaction sessions may be represented as an ordered list or array of strings, each string corresponding to a service interaction endpoint-operation type pair. For instance, for HTTP sessions, the array of strings may be ["GET/login," "POST/form," "GET/dashboard"]. Subsequently, the array of strings may be consolidated into a sequence database.

In Block 310, the set of ordered interaction sessions is processed with a sequential pattern mining function. A subset of temporal sequences of service interaction endpoints and corresponding operation types that have occurrence counts satisfying a frequency threshold is identified as a set of performance test scenarios. In one or more embodiments, a multitude of temporal sequences of service interaction endpoints and corresponding operation types may be extracted from the set of ordered interaction sessions. Further, the multitude of temporal sequences of service interaction endpoints and corresponding operation types may be processed with a sequential pattern mining function. Moreover, a result of processing may be identifying a subset of temporal sequences of service interaction endpoints and corresponding operation types having corresponding occurrence counts that satisfy a frequency threshold. Furthermore, the subset of temporal sequences of service interaction endpoints and corresponding operation types may be added to a performance test scenario dataset.

In an example implementation, the sequential pattern mining function used may be the Prefix-projected Sequential Pattern Mining (PrefixSpan) algorithm. The output of the PrefixSpan algorithm may include a set of frequency and pattern tuples, denoted as (pattern_frequency). Each tuple may indicate a frequently occurring subsequence (the "pattern") and the number of times the pattern appears in the sequence database (the "frequency"). The frequency of each pattern identified by the PrefixSpan algorithm may indicate the prevalence of the pattern as a performance test scenario. Patterns exhibiting higher frequencies may be considered to represent common, or typical, user interactions with the system. These high-frequency patterns may be prioritized as candidates for performance testing scenarios. Further, the high-frequency patterns may inform an understanding of how users navigate the user application and interact with diverse features of the user application.

As a general overview, achieving thorough performance testing that mirrors live application usage may entail the emulation of detailed user interactions. In the case of HTTP communication, performance tests may be required to mimic the diverse characteristics of HTTP traffic. The diverse characteristics may encompass variations in operation types (GET, POST, PUT, DELETE), header information (user-agent, content-type), request sizes, and response codes. The distribution of these characteristics may be identified and incorporated into the performance test scenarios. More particularly, sequences of service interaction endpoints that constitute complete user tasks may be identified. Performance test scenarios may simulate these end-to-end user tasks to uncover potential bottlenecks within complex workflows.

Accordingly, in Block 312, a set of variable attributes may be obtained from the structured network traffic dataset. The set of variable attributes may have a multitude of attribute fields. In one or more embodiments, the set of variable attributes may be obtained from the service interaction endpoints and corresponding operation types. Further, in Block 314, a subset of attribute fields from the set of variable attributes is identified, having corresponding occurrence counts satisfying an attribute frequency threshold.

In Block 316, a set of field placeholders and a set of corresponding synthetic field values is generated. The set of field placeholders corresponds to the subset of attribute fields. In one or more embodiments, the set of synthetic field values may be added to a synthetic test dataset in the repository. Further, individual field placeholders of the set of field placeholders may be included in DSL template entries, e.g., YAML template entries. The DSL template entries may be added to a DSL template repository.

In Block 318, for a candidate performance test scenario of the set of performance test scenarios, a DSL template is instantiated. The DSL template may include entries corresponding to the service interaction endpoints and corresponding operation types. The DSL template may further include DSL template entries of individual field placeholders, and corresponding synthetic field values, to obtain a corresponding performance test script template. In one or more embodiments, the candidate performance test scenario may be obtained from a performance test scenario dataset.

The candidate performance test scenario may include a temporal sequence of service interaction endpoints and corresponding operation types. Further, for a service interaction endpoint of the candidate performance test scenario, a corresponding DSL template may be generated. The DSL template may include entries corresponding to the service interaction endpoint and corresponding operation type. DSL template entries of individual field placeholders, corresponding to the service interaction endpoint may be added to the DSL template. The individual field placeholders may further be populated using synthetic field values corresponding to the service interaction endpoint. The synthetic field values may be obtained from the synthetic test dataset generated in Block 316. Thus, a performance test DSL template corresponding to the candidate performance test scenario may be obtained in this manner. The performance test DSL script may include a sequence of DSL templates corresponding to the temporal sequence of service interaction endpoints of the candidate performance test scenario.

In one or more embodiments, the DSL converter may extract the performance test metrics from the structured traffic dataset. The performance test metrics may encompass summarized metrics and patterns extracted from the indexed data repository of application layer request records. In addition to the performance test scenario dataset, the DSL converter may incorporate synthetic requests. Synthetic requests are artificially generated requests designed to cover edge cases, stress specific system components, or simulate future anticipated load increases. The DSL converter may further incorporate explicitly defined performance test scenarios that outline specific test objectives, for example, testing the performance of a particular user interaction sequence, evaluating the system's resilience under peak load, or verifying the impact of specific code changes.

Upon obtaining the diverse types of data described herein, the DSL converter (111) may integrate the obtained data to generate the final domain-specific document in a given file format, e.g., YAML format. For example, specific explicitly defined performance test scenario requirements may be mapped to performance test scenarios generated from the structured traffic dataset. Additionally, or alternatively, the performance test scenarios may be augmented with relevant synthetic requests for broader coverage of performance test scenarios. Further, the domain-specific document may be generated based on a pre-defined template for defining test requests, including service interaction endpoints, operation types, request parameters, headers, and expected responses. The obtained data is then populated into the domain-specific document. DSL template entries may be generated for the sequence of service interaction endpoints of a performance test scenario. The performance test metrics may inform the frequency and distribution of requests. Synthetic requests may be translated into DSL template entries. The generated domain-specific document is a DSL template, which serves as one input to the performance test script generator. Thus, the DSL converter generates DSL templates by integrating performance test scenarios which are in turn derived from application layer network traffic data, with specific testing requirements (synthetic requests and explicitly defined performance test scenarios).

FIG. 4 shows an example of a DSL template for a performance test scenario, in accordance with one or more embodiments. The following example is for explanatory purposes only and not intended to limit the scope of one or more embodiments.

Block 402 shows a performance test script written in a YAML format, for a Gatling testing framework. The performance test script simulates user interactions under varying load conditions. The framework defines a simulation titled "ExampleLoadTest," which targets a base URL (https://api.example.com) representing the system under test. The configuration specifies a user pool of 50 virtual users operating over a duration of 5m, with dynamic user credentials sourced from a CSV file (users.csv). These credentials are injected into the test flow using a feeder mechanism of type csv, referenced by the alias userCreds, allowing each virtual user to perform personalized login operations using field placeholders such as {{userCreds.username}} and {{userCreds.password}}.

The performance test scenarios include two primary transactions, namely, "LoginTransaction" and "DataFetch." During the login transaction, each user submits a POST request to the endpoint/login with a JSON body containing their credentials. Upon successful authentication, the response is parsed using the JSON path ("$.token") to extract an authentication token, which is stored in the variable authToken. The testing framework may validate the response with checks such as status: 200 and body_contains: "Welcome," followed by a simulated pause of 2s. In the subsequent GET request to/data, the token is used in the authorization header as bearer {{auth Token}}, and the response is validated for both status: 200 and a performance constraint of response_time_lt: 1000 milliseconds.

The load profile is designed to emulate real-world usage patterns. The load ramps the users to 50 (ramp_users: 50) over a duration of 60s, followed by a sustained load (hold_for: 4m). A sudden surge is introduced (spike_users: count: 100) for a duration of 30s, and then the load increases incrementally (step_users: increment: 10), with each step lasting 30s and held for 2m (hold_duration: 2m). This structured approach facilitates comprehensive evaluation of system performance, stability, and scalability under diverse operational conditions.

FIG. 5 shows an example of an execution graph, and a performance test script generated for Gatling based on the DSL template of FIG. 4, in accordance with one or more embodiments. The following example is for explanatory purposes only and not intended to limit the scope of one or more embodiments.

In FIG. 5, Block 502 shows an example of an execution graph. The execution graph shown in Block 502 corresponds to the execution graph (114) of FIG. 1. The execution graph consists of various nodes. The start node (_start_) initializes the execution context and triggers the AI agent. The AI agent may interpret the input, manage the execution state, and make decisions about which tools to invoke based on the current context and user instructions. The execution graph as shown includes an initial node and one or more tool nodes. The initial node, as shown in the graph may be a "smart" node, or the node that controls the execution of one or more tool nodes based on transition conditions (e.g., "continue"). The tool nodes may include, for example, a RAG tool performing a vector-based search to obtain contextually relevant samples and templates from the data repository. Another example of a tool node may be a validation tool, which is a post-processing module that verifies the syntactic and semantic correctness of the generated output. The execution graph further includes an output generation node, which may format the final output into the appropriate structure for the target performance testing tool. Finally, the end node (_end_) terminates the execution flow.

Block 504 shows the sample generated performance test script, corresponding to the DSL template of Block 402 in FIG. 4. Blocks 506 and 508 show examples of prompts generated by the AI agent and programmatically presented to the LLM. Block 506 may serve as the overarching instruction to generate the performance test script, with sub-tasks to be performed. Notably, the LLM may use a prompt similar to Block 506 to generate the multiple processing steps that instantiate the nodes of the execution graph. The multiple processing steps may in turn include prompts. For example, Block 508 shows a prompt that may serve as an instruction for an input parsing processing step.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
obtaining a network traffic dataset of a plurality of application layer requests with a plurality of service interaction endpoints;
grouping the plurality of service interaction endpoints into a set of interaction sessions;
ordering the set of interaction sessions according to a timestamp of the plurality of service interaction endpoints to obtain a set of ordered interaction sessions;
generating a performance test scenario from an ordered interaction session in the set of ordered interaction sessions;
receiving a request to generate a performance test script from a performance testing application, wherein the request comprises a test script type and the performance test scenario;
constructing an execution graph comprising a plurality of nodes connected by a plurality of edges, wherein construction of the execution graph comprises:
instantiating the plurality of nodes for a plurality of processing steps for generating the performance test script based on the performance test scenario and the test script type, and
connecting the plurality of nodes by the plurality of edges, wherein connecting two nodes of the plurality of nodes by an edge comprises defining a transition condition for transitioning from a first processing step to a second processing step corresponding to the two nodes;
executing the execution graph, to obtain the performance test script; and
transmitting the performance test script to the performance testing application.

2. The method of claim 1, further comprising:
obtaining network traffic data between a plurality of user application instances and a plurality of target services;

processing the network traffic data to generate a plurality of performance test scenarios of the plurality of user application instances and the plurality of target services; and
generating, by a large language model (LLM), the plurality of processing steps, based on the request.

3. The method of claim 1, wherein executing the execution graph comprises:
performing, by an artificial intelligence (AI) agent, an initial processing step of the plurality of processing steps, and
performing, by the AI agent, a subsequent processing step comprising one of an intermediate action step, and an output generation step, based on a transition condition.

4. The method of claim 3, wherein performing the intermediate action step comprises performing an input parsing step comprising:
obtaining a performance test DSL template corresponding to the performance test scenario, and
parsing the performance test DSL template to obtain a temporal sequence of service interaction endpoints.

5. The method of claim 3, wherein performing the intermediate action step comprises performing a reference retrieval step, comprising retrieving a reference test script corresponding to the test script type.

6. The method of claim 3, wherein performing the intermediate action step comprises performing a script generation step comprising:
instantiating the performance test script based on a reference test script, and populating the performance test script with a temporal sequence of service interaction endpoints.

7. The method of claim 3, wherein performing the output generation step comprises returning the performance test script.

8. The method of claim 1, further comprising:
extracting, from network traffic data, the plurality of service interaction endpoints and a plurality of corresponding operation types;
obtaining, from the plurality of service interaction endpoints and the plurality of corresponding operation types, a set of consistent attributes and a set of variable attributes;
aggregating the network traffic data based on at least one consistent attribute of the set of consistent attributes to obtain aggregated traffic data;
determining, from the aggregated traffic data, a set of performance test metrics; and
adding the plurality of service interaction endpoints and the plurality of corresponding operation types, the set of consistent attributes, the set of variable attributes, and the set of performance test metrics, to the network traffic dataset.

9. The method of claim 1, further comprising:
parsing the network traffic dataset to extract the plurality of service interaction endpoints and a plurality of corresponding operation types; and
grouping the plurality of service interaction endpoints and the plurality of corresponding operation types into at least one interaction session comprising a subset of service interaction endpoints and corresponding operation types,
the subset of service interaction endpoints and corresponding operation types having at least one of a common application session identifier and a common user identifier,
to obtain the set of interaction sessions.

10. The method of claim 1, further comprising:

obtaining the set of interaction sessions from the network traffic dataset; and for at least one interaction session of the set of interaction sessions, ordering the at least one interaction session, based on timestamps corresponding to individual service interaction endpoints of the at least one interaction session, to obtain at least one ordered interaction session comprising a temporal sequence of the individual service interaction endpoints, to obtain the set of ordered interaction sessions.

11. The method of claim 1, further comprising:

obtaining the set of ordered interaction sessions from the network traffic dataset, each ordered interaction session comprising a temporal sequence of service interaction endpoints and corresponding operation types;

extracting a plurality of temporal sequences of service interaction endpoints and corresponding operation types from the set of ordered interaction sessions;

processing the plurality of temporal sequences of service interaction endpoints and corresponding operation types with a sequential pattern mining function to identify a subset of temporal sequences of service interaction endpoints and corresponding operation types having corresponding occurrence counts that satisfy a frequency threshold; and adding the subset of temporal sequences of service interaction endpoints and corresponding operation types to a performance test scenario dataset.

12. The method of claim 1, further comprising:

obtaining the network traffic dataset comprising a set of variable attributes, the set of variable attributes comprising attribute fields;

identifying a subset of attribute fields from the set of variable attributes having corresponding occurrence counts satisfying a frequency threshold;

generating a set of field placeholders corresponding to the subset of attribute fields;

generating a set of synthetic field values corresponding to the set of field placeholders, and adding the set of synthetic field values to a synthetic test dataset; and generating domain-specific language (DSL) template entries comprising field placeholders of the set of field placeholders and adding the DSL template entries to a DSL template repository.

13. The method of claim 1, further comprising:

obtaining a candidate performance test scenario from a performance test scenario dataset, wherein the candidate performance test scenario comprises a temporal sequence of service interaction endpoints and corresponding operation types; and for a service interaction endpoint of the candidate performance test scenario, instantiating a DSL template corresponding to the service interaction endpoint, comprising entries corresponding to the service interaction endpoint, a corresponding operation type of the service interaction endpoint, adding DSL template entries comprising field placeholders corresponding to the service interaction endpoint to the DSL template, and populating the field placeholders of the DSL template using synthetic field values corresponding to the service interaction endpoint, obtained from a synthetic test dataset, to obtain a performance test DSL template corresponding to the candidate performance test scenario, comprising a sequence of DSL templates corresponding to the temporal sequence of service interaction endpoints.

14. A system, comprising:

at least one computer processor; and a performance test script generator, executing on the at least one computer processor, and comprising an AI agent, and configured for:

obtaining a network traffic dataset of a plurality of application layer requests with a plurality of service interaction endpoints, grouping the plurality of service interaction endpoints into a set of interaction sessions, ordering the set of interaction sessions according to a timestamp of the plurality of service interaction endpoints to obtain a set of ordered interaction sessions, generating a performance test scenario from an ordered interaction session in the set of ordered interaction sessions, receiving a request to generate a performance test script from a performance testing application, wherein the request comprises a test script type, and a performance test scenario, constructing an execution graph comprising a plurality of nodes connected by a plurality of edges, wherein construction of the execution graph comprises:

instantiating the plurality of nodes with a corresponding plurality of processing steps for generating the performance test script based on the performance test scenario and the test script type, and connecting the plurality of nodes by the plurality of edges, wherein connecting two nodes of the plurality of nodes by an edge comprises defining a transition condition for transitioning from a first processing step to a second processing step corresponding to the two nodes, executing the execution graph, to obtain the performance test script, and transmitting the performance test script to a performance testing application.

15. The system of claim 14, further configured for:

obtaining, by a gateway load controller executing on the at least one computer processor, network traffic data between a plurality of user application instances and a plurality of target services;

replicating, by a traffic replicator service executing on the at least one computer processor, the network traffic data to obtain replicated traffic data; and processing the replicated traffic data to generate a plurality of performance test scenarios of the plurality of user application instances and the plurality of target services.

16. The system of claim 14, wherein executing the execution graph further comprises:

performing an initial processing step of the corresponding plurality of processing steps, performing a subsequent processing step comprising one of a plurality of intermediate action steps, or an output generation step, based on a transition condition.

17. The system of claim 14, further configured for:

extracting, by an extract-transform-load (ETL) engine, from network traffic data, the plurality of service interaction endpoints and a plurality of corresponding operation types;

obtaining, by the ETL engine, from the plurality of service interaction endpoints and the plurality of corresponding operation types, a set of consistent attributes and a set of variable attributes;

aggregating, by the ETL engine, the network traffic data based on at least one consistent attribute of the set of consistent attributes to obtain aggregated traffic data;

determining, from the aggregated traffic data, a set of performance test metrics; and adding the plurality of service interaction endpoints and the plurality of corresponding operation types, the set of consistent attributes, the set of variable attributes, and the set of performance test metrics, to the network traffic dataset.

18. The system of claim 14, further configured for:

parsing the network traffic dataset to extract the plurality of service interaction endpoints and corresponding operation types; and grouping the plurality of service interaction endpoints and corresponding operation types into at least one interaction session comprising a subset of service interaction endpoints and corresponding operation types, the subset of service interaction endpoints and corresponding operation types having at least one of a common application session identifier and a common user identifier, to obtain the set of interaction sessions.

19. The system of claim 14, further configured for:

obtaining the network traffic dataset comprising a set of variable attributes, the set of variable attributes comprising attribute fields;

identifying a subset of attribute fields from the set of variable attributes having corresponding occurrence counts satisfying a frequency threshold;

generating a set of field placeholders corresponding to the subset of attribute fields;

generating a set of synthetic field values corresponding to the set of field placeholders, and adding the set of synthetic field values to a synthetic test dataset; and generating domain-specific language (DSL) templates comprising field placeholders of the set of field placeholders and adding the DSL templates to a DSL template repository.

20. A method, comprising:

obtaining network traffic data between a plurality of user application instances and a plurality of target services;

extracting, from the network traffic data, a plurality of service interaction endpoints and corresponding operation types, a set of consistent attributes of the service interaction endpoints and a set of variable attributes of the service interaction endpoints;

obtaining a set of performance test metrics from aggregating the network traffic data based on at least one consistent attribute of the set of consistent attributes;

grouping the plurality of service interaction endpoints by at least one of a common application session identifier and a common user identifier to obtain a set of interaction sessions;

ordering the set of interaction sessions based on timestamps of service interaction endpoints corresponding to individual interaction sessions to obtain a set of ordered interaction sessions, each ordered interaction session comprising a corresponding temporal sequence of the service interaction endpoints; and processing the set of ordered interaction sessions with a sequential pattern mining function to identify a subset of temporal sequences of service interaction endpoints having corresponding occurrence counts that satisfy a frequency threshold as a plurality of performance test scenarios.

* * * * *